US010768964B2

(12) United States Patent
Kurichiyath et al.

(10) Patent No.: US 10,768,964 B2
(45) Date of Patent: Sep. 8, 2020

(54) VIRTUAL MACHINE MESSAGING (71) Applicant: HEWLETT PACKARD ENTERPRISE DEVELOPMENT LP, Houston, TX (US)

(72) Inventors: Sudheer Kurichiyath, Bangalore (IN); Joel E. Lilienkamp, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 180 days.

(21) Appl. No.: 15/762,295

(22) PCT Filed: Mar. 29, 2016

(86) PCT No.: PCT/US2016/024712
§ 371 (c)(1),
(2) Date: Mar. 22, 2018

(87) PCT Pub. No.: WO2017/119918
PCT Pub. Date: Jul. 13, 2017

(65) Prior Publication Data
US 2018/0267821 A1    Sep. 20, 2018

(30) Foreign Application Priority Data

Jan. 5, 2016   (IN) .............. 201641000297

(51) Int. Cl.
*G06F 9/46*       (2006.01)
*G06F 9/455*      (2018.01)
(Continued)

(52) U.S. Cl.
CPC .......... *G06F 9/45558* (2013.01); *G06F 3/067* (2013.01); *G06F 3/0611* (2013.01);
(Continued)

(58) Field of Classification Search
None
See application file for complete search history.

(56) References Cited

U.S. PATENT DOCUMENTS 8,307,191 B1 * 11/2012  Jain ................ G06F 12/1036
                                                          711/206
8,832,688 B2   9/2014  Tang et al.
(Continued)

FOREIGN PATENT DOCUMENTS

GB        2519578 A          4/2015
WO     WO-2015042684         4/2015

OTHER PUBLICATIONS

Bellinger, N., "KVM I/O Performance and End-to-end Reliability," Oct. 13, 2014, 18 pages.
(Continued)

*Primary Examiner* — Wissam Rashid
(74) *Attorney, Agent, or Firm* — Jaffery Wason Mendonsa & Hamilton (57) ABSTRACT

Techniques for enabling communication between a virtual machine and the host of the virtual machine are disclosed. An example computing device includes a host operating system and a virtual machine running on the host operating system. The storage device also includes a split driver. The split driver includes a frontend driver residing on the virtual machine and a backend driver residing on the host. The split driver processes messages received from the virtual machine and passes the messages from the frontend driver to the backend driver.

17 Claims, 5 Drawing Sheets

(51) Int. Cl.
  *G06F 9/54* (2006.01)
  *G06F 3/06* (2006.01)
  *G06F 12/10* (2016.01)
(52) U.S. Cl.
  CPC .......... *G06F 3/0659* (2013.01); *G06F 3/0665* (2013.01); *G06F 9/54* (2013.01); *G06F 12/10* (2013.01); *G06F 2009/45579* (2013.01); *G06F 2212/1008* (2013.01); *G06F 2212/657* (2013.01)

(56) References Cited

U.S. PATENT DOCUMENTS

| | | | | |
|---|---|---|---|---|
| 8,935,506 | B1* | 1/2015 | Gopalan | G06F 12/1009 711/202 |
| 8,938,571 | B1* | 1/2015 | Vincent | G06F 12/023 370/429 |
| 9,043,501 | B2 | 5/2015 | Ben et al. | |
| 9,069,591 | B1 | 6/2015 | Beloussov et al. | |
| 9,135,043 | B1 | 9/2015 | Srinivasan et al. | |
| 2005/0246453 | A1 | 11/2005 | Erlingsson et al. | |
| 2008/0104589 | A1 | 5/2008 | McCrory et al. | |
| 2009/0313406 | A1 | 12/2009 | Suh et al. | |
| 2012/0216191 | A1 | 8/2012 | Tsai | |
| 2014/0122828 | A1* | 5/2014 | Kagan | G06F 12/1081 711/206 |
| 2015/0121376 | A1* | 4/2015 | Graham | G06F 9/45533 718/1 |
| 2015/0263887 | A1* | 9/2015 | Sajeepa | H04L 41/0803 709/220 |

OTHER PUBLICATIONS

He, A., "vhost-blk: Add vhost-blk support v2," Oct. 9, 2012, 9 pages, https://lwn.net/Articles/519880/.

Jones, M. T., "Virtio: An I/O Virtualization Framework for Linux," Paravirtualized I/O with KVM and Iguest, Jan. 29, 2010, 9 pages, http://www.ibm.com/developerworks/library/I-virtio/.

Marazakis, M., "I/O in Linux Hypervisors and Virtual Machines Lecture for the Embedded Systems Course CSD, University of Crete," May 2014, 78 pages, http://www.csd.uoc.gr/~hy428/reading/vmio_may8_2014.pdf.

\* cited by examiner

VIRTUAL MACHINE MESSAGING

BACKGROUND

Two common types of storage are Storage Area Network (SAN) and Network Attached Storage (NAS). A SAN enables computers access to a pool of block storage in which any computer can potentially access any storage unit with the block storage. Such storage devices may be referred to as block-level storage. A NAS is a file level type of storage that operates a server and shares files over a network. A NAS may be referred to as a file-level storage device.

BRIEF DESCRIPTION OF THE DRAWINGS

Certain exemplary examples are described in the following detailed description and in reference to the figures, in which.

DETAILED DESCRIPTION OF SPECIFIC EXAMPLES

In one example, the present disclosure provides techniques for helping to increase the speed at which a virtual machine is able to process Input/Output (IO) transactions. A virtual machine can include one or more interfaces by which the virtual machine communicates with computing resources such as computer memory, data storage, networks, user input devices, and others. Communication by the virtual machine with computing resources often relies on a stack of several such interfaces. The present disclosure provides a general-purpose low-overhead messaging mechanism for enabling a virtual machine to communicate with computing resources. The messaging mechanism described herein is not dependent on the standard block layers and interfaces of the host operating system and is therefore able to bypass the overheads and complexities of these standard operating system interfaces.

In some examples, the techniques described herein are implemented in a storage device that uses a virtual machine to provide to provide storage services. As the information technology (IT) field is faced with challenges associated with data growth, the ability to merge block-level storage and file-level storage to provide a stream-lined management system may become increasingly important. A unified storage appliance is a storage device that includes both file-level storage and block-level storage. The unified storage device described herein uses a virtual machine to provide the file-level storage services. As used herein, the term "host" refers to the computing device that runs the hypervisor, which creates and runs the virtual machine. The unified file services may be run as a virtual machine hosted on the operating system of the storage appliance. One or more virtual volumes abstracted under block drivers may be exposed to a virtual filer running inside the virtual machine. However, the performance of the virtualized I/O path of the virtual machine may be significantly lower than the native performance of the block drivers themselves.

In examples of the techniques described herein, the performance of a unified storage appliance is increased such that it can operate at or near the native, i.e. bare metal, performance of the storage including block, file, and others. This is accomplished through the use of a split driver architecture wherein the frontend of the driver resides in the virtual machine and the backend of the driver resides in the host. In this way, the virtual machine hypervisor can be bypassed for most storage operations.

Figure 1:
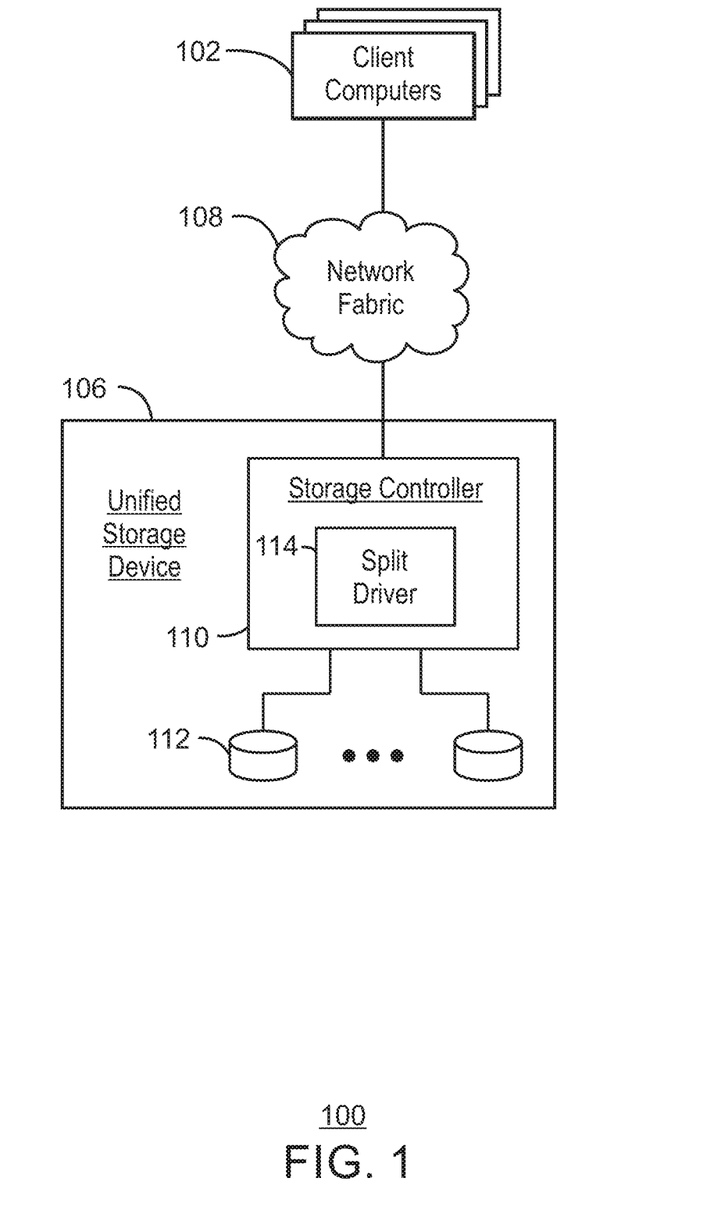
FIG. 1 is block diagram of an example storage network that includes a unified storage device in accordance with the present techniques.

FIG. 1 is block diagram of an example storage network that includes a unified storage device in accordance with the present techniques. The computer system 100 may be used to provide storage services for clients. The computer system 100 may include one or more client computers 102 that communicate with the unified storage device 106. The client computers 102 may be user workstations, servers, and other computing devices. The client computers 102 are coupled to the unified storage device 106 through a network fabric 108. The network fabric can use any suitable interconnection technology, such as SCSI switches. In operation, applications running on the client computers 102 may access the unified storage device 106 to store and retrieve data. The unified storage device 106 includes a storage controller 110 coupled to an array of storage media 112. The storage media 112 can include hard drives, tape libraries, and, more commonly, disk-based devices, for example, RAID hardware.

The storage controller 110 may be any type of processor and runs the software, e.g. operating system, hypervisor, and virtual machine, that provides both block-level storage and file-level storage for the computer system 100. In some examples, the storage controller uses the Linux Kernel-Based Virtual Machine (KVM), wherein the Linux operating system operates as a hypervisor. The storage controller 110 includes a split driver 114 that enables communication between the virtual machine and the host operating system in which the virtual machine resides. The split driver 114 enables any type of communication between the virtual machine and the host operating system. For example, to improve the performance of the unified storage device 106 when operating as a file-level storage system, the split driver 114 of the storage controller 110 controls access to the storage media 112 by handling IO requests between the virtual machine and the host operating system. Examples of the split driver are described further below in relation to FIGS. 2 and 3, which describe techniques for handling IO requests. However, it will be appreciated that the techniques described herein can handle other types of communication between a virtual machine and the host operating system.

Further, it is to be understood that the illustrations of FIG. 1 is not intended to indicate that the computer systems 100 is to include all of the components shown in the figures in every example. Further, any number of additional components can be included within the computer system 100 depending on the details of the specific implementations.

Figure 2:
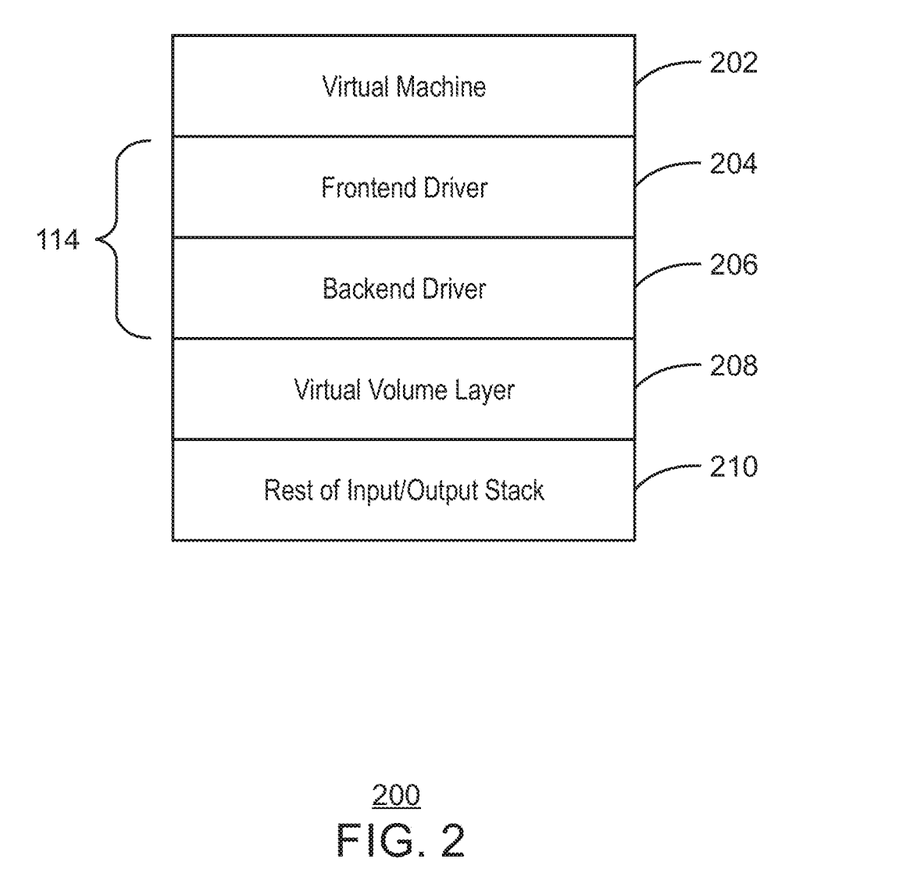
FIG. 2 is an example of a driver stack operating on the storage controller of the unified storage device.

FIG. 2 is an example of a driver stack operating on the storage controller of the unified storage device. The driver stack 200 includes a virtual machine 202, a frontend driver 204, a backend driver 206, a virtual volume layer 208, and the remainder of the I/O stack 210. The split driver 114 referenced in FIG. 1 includes the frontend driver 204 and the backend driver 206. The frontend driver 204 resides in the virtual machine, while the backend driver 206 resides on the host operating system, which may be referred to herein simply as the host. Storage commands from the virtual machine are communicated from the frontend driver 204 to the backend driver 206 without involvement of the hypervisor, except for certain circumstances, which will be explained further below. The backend driver 206 issues block-level storage commands to the virtual volume layer 208. The virtual volume layer 208 communicates with the remainder of the I/O stack 210 to retrieve or store data to the physical storage media.

To enable communication between the frontend driver 204 residing in the virtual machine and the backend driver 206 residing in the host, a virtual machine context is established to enable the host to translate the addresses of the virtual machine. In examples, the virtual machine context is a combination of task structure and memory management structure. The task structure provides an abstraction of memory that enables the virtual machine to access resources of the host. The memory management structure enables translation between memory addresses used by the virtual machine and physical memory addresses used the host operating system. Once the virtual machine context is created, the host can obtain the Virtual Volume Identifier (VVID) of the virtual volume targeted by a particular storage operation received from the virtual machine. Storage operations can be sent to the identified virtual volume to translate the virtual memory addresses to the host domain. In some examples, the context is passed to the standard Linux Kernel Zero-Copy function get_user_pages to retrieve the pages in the host that correspond to the addresses in the virtual machine.

The virtual machine context may be stored as an in-memory pseudo block device, referred to herein as the "discover volume." The discovery volume may be exposed to the virtual machine through a virtualized IO driver, such as KVM VIRTIO for example. On the host side, the discovery volume is implemented as an in-memory block device having two or more blocks depending on how many virtual volumes need to be exposed to the virtual machine. The first block of the discovery volume is the driver head, and contains information such as version number of the split driver and number of virtual volumes. The information for each virtual volume is stored to a separate additional block. The information for each virtual volume can include the virtual volume's VVID and name. The hypervisor can open the discovery volume while booting the virtual machine and fill in the details of the discovery volume. The virtual machine can perform a discovery process to read the discovery volume contents and create device names for every virtual volume recorded in the discovery volume. The discovery process may be performed by the virtual machine when the virtual machine is booted or later.

Figure 3:
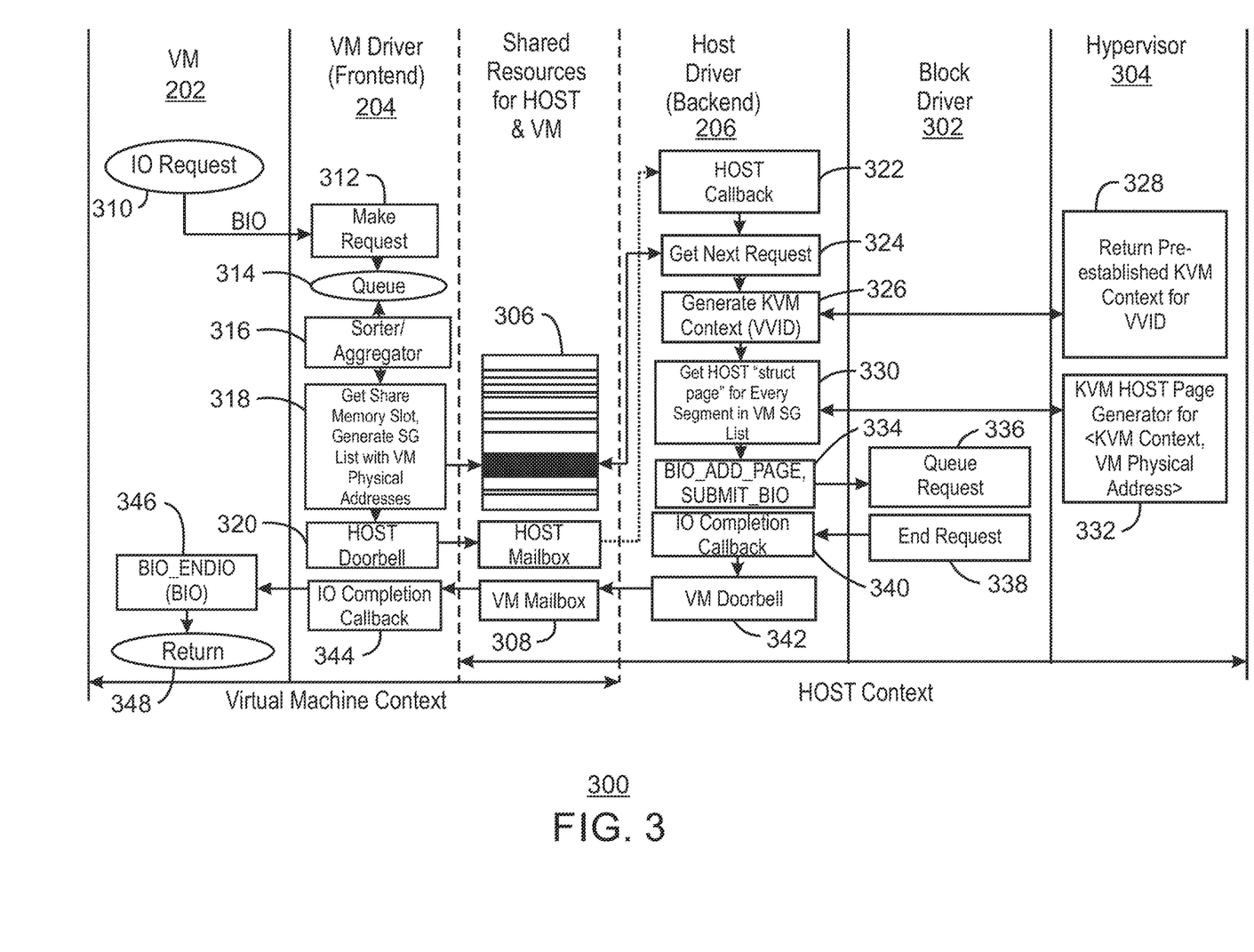
FIG. 3 is a process flow diagram showing a method of processing storage instructions in the unified storage device.

FIG. 3 is a process flow diagram showing a method of processing storage instructions in the unified storage device. As shown in FIG. 3, the disclosed architecture includes the virtual machine 202 and the frontend driver 204, both of which reside in the virtual machine domain. The architecture also includes the backend driver 206, the block driver 302, and the Hypervisor 304, all of which reside in the host domain. The architecture also includes a shared IO ring 306 and signaling framework 308, which enable the frontend and backend drivers to interact with one another in an IO initiation and completion path. In some examples, the shared IO ring 306 uses zero-copy messaging. The signaling framework 308 may be a low latency signaling framework and enables the frontend and backend drivers to signal one another for initiating and completing IOs.

The hypervisor 304 plays a very limited role in the IO Path. The hypervisor 304 is used in setting up the shared IO ring 206 and for mapping the virtual machine's address and range pair into the host's kernel virtual address space. The hypervisor 304 is also called to translate the virtual machine's memory segments to memory addressed in the host for issuing storage transactions.

To initiate a storage transaction, the virtual machine issues an IO request to the frontend driver 204 at block 310. In an example that uses the Linux kernel, the IO initiation is done in the block storage via the kernel function generic_make_request, which in turn calls the make_request interface 312 on the block driver underneath. The make_request interface 312 of the block driver receives a task data structure containing the task information. The task information can include information identifying the source or destination of the data and the type of operation, such as whether the task is a read operation or write operation. For a read operation, the task information can include a starting block number and a number of bytes to read. For a write operation, the task information can include the payload data, and a destination block number.

The make_request interface 312 of the frontend driver 204 sends the request to a queue 314 for sorting and aggregation. The sorter/aggregation component 316 creates a pipeline stage and collects as many requests as possible in the shared IO ring 306 before the backend driver 206 is signaled to process them. In some examples, the sorter/aggregation component 316 collects and sorts the requests using the Linux IO Scheduler.

At block 318, once the sort/aggregation pipeline is completed, a slot in the shared IO ring 306 is allocated. If all slots are taken, then the IO request will be put to wait until there is a free slot. Also at block 318, after the successful allocation of a slot in the shared IO ring 306, the frontend driver 204 enters the details of the IO request in the slot. The details of the IO request may include a Virtual Volume identifier (VVID), whether the IO is a read or write, Sector number, Number of bytes to be read or written, and the physical addresses for every page/segment in the task data structure.

At block 320, once the entry is made in the shared IO ring, the frontend driver 204 presses the doorbell of the backend driver 206, which results in a callback on the host side to proceed with the IO processing. The number of host doorbell presses by the frontend driver 204 is reduced by merging several requests into fewer ones, as described above. This saves CPU cycles both on the virtual machine and the host.

At block 322, the backend driver 206 in the host wakes up for processing the IO requests when it receives the doorbell from the frontend driver 204. At block 324, the backend driver 206 picks up the next IO request from the corresponding slot in the shared IO Ring 306 and finds one or more memory pages for every address filled by the frontend driver 204 in the shared IO Ring slot. In some examples, the host uses the Linux zero copy function called get_user_pages to generate "struct pages" corresponding to the addresses filled by the frontend driver 204.

At block 326, the backend driver 206 obtains the virtual machine context corresponding to the VVID identified in the IO request. The discovery volume described above is used to enable the host to retrieve the task structure and the memory management structure for each IO issued by the frontend driver 204. The frontend driver 204 fills a VVID field for every entry in the shared IO ring 306. The VVID that the frontend driver 204 fills while making entry into the shared IO Ring 306 is a combination of virtual machine context and the VVID of the device targeted by the IO. Once the host receives the VVID, the host extracts the task ID and retrieves task structure and memory management structure by calling a hypervisor functions that returns the task and memory management structures.

The hypervisor function 328 returns the pre-established hypervisor context for the identified VVID. At block 330, the hypervisor function 332 returns the virtual machine physical address for the corresponding hypervisor context. Hypervisor functions, such as translating virtual machine addresses and creating and generating contexts, may be performed by cleanly abstracted Application Programming Interfaces (APIs) without any layering conflicts.

At block 334, once the memory pages are retrieved, the backend driver 206 fills the allocated task data structure with sector, bytes, and adds pages of user buffers. The backend driver 206 then submits the IO request to the block driver 302 with a custom IO completion callback.

At block 336, the IO request is queued in the block driver 302. In some examples, the IO request is in the form of a BIO containing block number, one or more pages to read data from or write data to for processing. The queued IO request also contains a callback function which marks the completion of the IO request whether the IO request is successful or failed. When the IO request is completed, the process flow advances to block 338.

At block 338, the block driver 302 invokes the callback function mentioned in relation to block 336 to update the ID completion status of the shared IO ring 306.

At block 340, upon IO completion of the IO request by the block driver 302, the custom IO completion callback gets called with the status of the IO request, the status indicating that the IO request was successful or indicating a type of error, for example. The completion callback inserts this status to a field in the corresponding the slot in the shared IO Ring 306. The backend driver then presses the virtual machine's doorbell at block 342 to trigger the final completion of the IO request in the virtual machine 202. Like in host doorbells, a number of completions are grouped to save CPU cycles on the host and virtual machine sides.

At block 344, the virtual machine doorbell press by the backend driver 206 invokes the IO completion callback in the virtual machine frontend driver 204. The frontend driver 204 reads the status of the IO request in the status field of the shared IO ring entry.

At block 346, the frontend driver 204 marks the previously initiated IO as completed and indicates whether the IO was successfully completed or failed. For example, in Linux, the frontend driver 204 calls the Linux kernel function bio_endio with appropriate error value (0 for success and others for failure) to mark the end of the IO transaction. The process flow then advances to block 348.

At block 348, the result of the IO is returned to the host. In the case of a read request, the requested data is sent to the host. In the case of a write request, the status will be sent to the host indicating whether the data was successfully stored.

It is to be understood that the process flow diagram of FIG. 3 is not intended to indicate that the method is to include all of the blocks shown in FIG. 3 in every case. Further, any number of additional blocks can be included within the method, depending on the details of the specific implementation. In addition, it is to be understood that the process flow diagram of FIG. 3 is not intended to indicate that the method is only to proceed in the order indicated by the blocks shown in FIG. 3 in every case.

Figure 4:
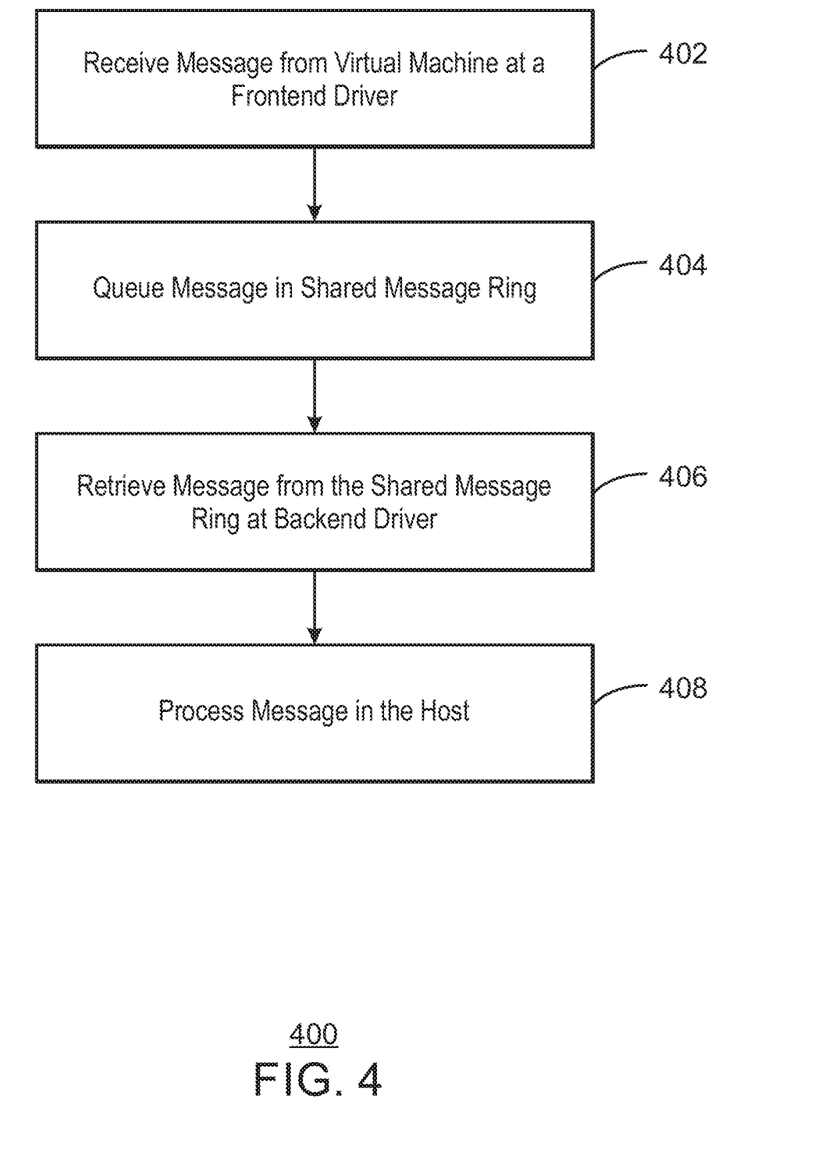
FIG. 4 is a process flow diagram summarizing a method of passing messages between a virtual machine and a host operating system.

FIG. 4 is a process flow diagram summarizing a method of passing messages between a virtual machine and a host operating system. In some examples, the message is a storage IO instruction and the virtual machine is running in a storage appliance such as the unified storage device described above. However, the message may be other types of messages including other types of IO such as IO from a network interface device, for example.

At block 402, a message is received from a virtual machine at a frontend driver residing in the virtual machine. As described above, the frontend driver is the part of the split driver that resides in the virtual machine.

At block 404, the message is queued by the frontend driver in a shared message ring. In some examples, several messages can be queued before the process flow advances to block 406.

At block 406, the message is retrieved from the shared message ring by a backend driver residing in the host. As described above, the backend driver is the part of the split driver that resides in the host operating system.

At block 408, the message is processed in the host. In some examples, processing the message includes translating a storage address contained in the IO request, retrieving the data from the corresponding storage location identified by the storage address, and returning the data to the virtual machine via the split driver. Processing the message may also include translating addresses of the virtual machine to addresses of the host operating system. The translation may be enabled by a context stored to a virtual volume by the host and obtained by the virtual machine by a volume discovery process.

It is to be understood that the process flow diagram of FIG. 4 is not intended to indicate that the method is to include all of the blocks shown in FIG. 4 in every case. Further, any number of additional blocks can be included within the method, depending on the details of the specific implementation. In addition, it is to be understood that the process flow diagram of FIG. 4 is not intended to indicate that the method is only to proceed in the order indicated by the blocks shown in FIG. 4 in every case.

Figure 5:
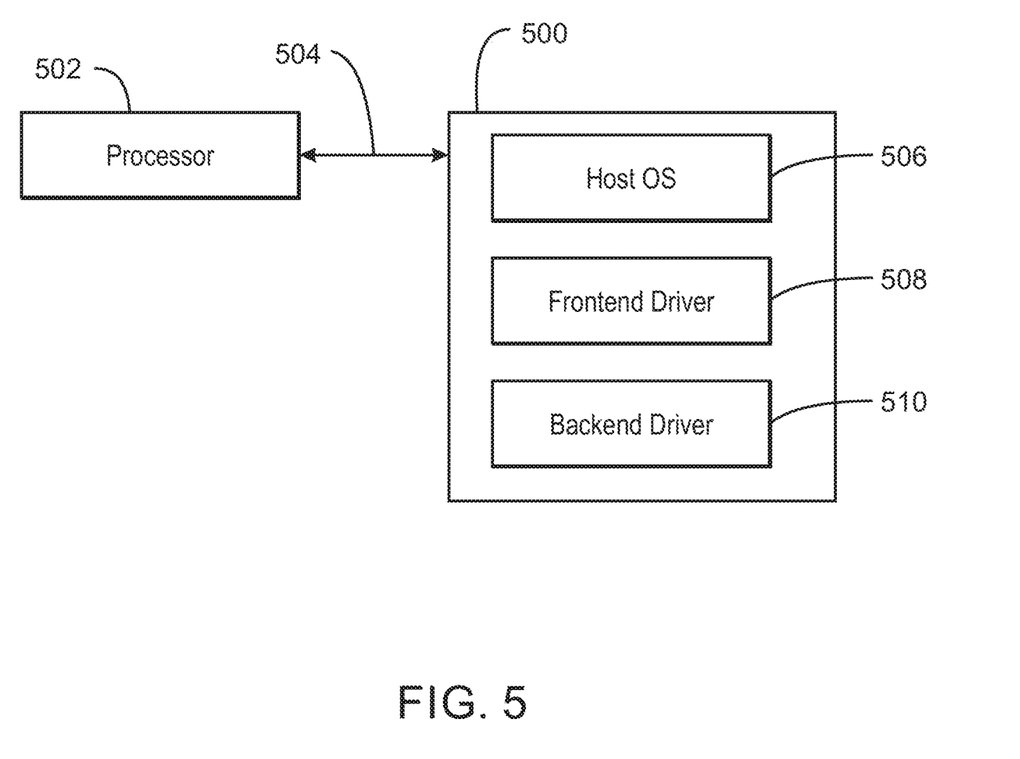
FIG. 5 is a block diagram of a tangible, non-transitory, computer-readable medium that includes code to direct a processor to enable message passing between a virtual machine and a host operating system.

FIG. 5 is a block diagram of a tangible, non-transitory, computer-readable medium that includes code to direct a processor to enable message passing between a virtual machine and a host operating system. The computer-readable medium 500 can be accessed by a processor 502 over a system bus 504. In some examples, the code may direct the processor 502 to perform the techniques as described with respect to FIGS. 1 to 4. In examples, the storage device may implement a virtualized management system to provide block-level storage services and file-level storage services, where the file-level storage services operate in an isolated environment separate from the block-level services.

The computer-readable medium 500 may include a host operating system 506. The host operating system 506 resides on a host computing device and runs a hypervisor, which creates and runs one or more virtual machines. The computer-readable medium 500 also includes a split driver used for messaging between the virtual machine domain and the host domain. The split driver includes the frontend driver 508, which resides in the virtual machine domain, and the backend driver 510 which resides in the host domain. In some examples, the messages are storage transactions or other types of IO.

The block diagram of FIG. 5 is not intended to indicate that the computer-readable medium 500 is to include all of the components or modules shown in FIG. 5. Further, any number of additional components may be included within the computer-readable medium 500, depending on the details of the specific implementations as described herein.

While the present techniques may be susceptible to various modifications and alternative forms, the examples discussed above have been shown only by way of example. However, it should again be understood that the techniques are not intended to be limited to the particular examples disclosed herein. Indeed, the present techniques include all alternatives, modifications, and equivalents falling within the scope of the appended claims.

What is claimed is:

1. A computing device, comprising:
a host operating system;
a virtual machine running on the host operating system; and
a split driver comprising:
a frontend driver residing on the virtual machine, and
a backend driver residing on the host, the split driver to process messages received from the virtual machine,
wherein the messages are passed from the frontend driver to the backend driver via a message ring shared between the frontend driver and the backend driver to provide zero-copy communication between the frontend driver and the backend driver,
wherein the backend driver establishes a context with the virtual machine to translate addresses of the virtual machine to addresses of the host for processing the messages,
wherein the context is saved in a virtual volume by the host operating system, and
wherein a plurality of messages are collected on the shared message ring prior to the backend driver being signaled to process the messages.

2. The computing device of claim 1, wherein the frontend driver combines a virtual machine context and a virtual volume identifier (VVID) of a device targeted by an input/output (IO) request, the combined value being used to retrieve a memory context that enables the translation of virtual machine addresses to addresses of the host operating system.

3. The computing device of claim 1, wherein the virtual machine runs a volume discovery process to obtain the context.

4. The computing device of claim 1, wherein the host operating system saves the context enabling the translation to the virtual volume for each volume to be exposed to the virtual machine for use by the virtual machine.

5. The computing device of claim 1, wherein the computing device is a storage appliance and the virtual machine running on the host operating system provides file-level storage and block-level storage to a network.

6. The computing device of claim 1, wherein the messages are Input/Output (IO) requests.

7. A method comprising:
receiving a message from a virtual machine at a frontend driver residing in the virtual machine, the message to be sent to a host of the virtual machine;
queuing, by the frontend driver, messages in a shared message ring, wherein the messages comprise a callback function;
retrieving, by a backend driver residing in the host, the messages from the shared message ring; and
processing the messages in the host, wherein
the message ring is shared between the frontend driver and the backend driver to provide zero-copy communication between the frontend driver and the backend driver, and
a plurality of messages are collected on the shared message ring prior to the backend driver being signaled to retrieve the messages for processing by the host.

8. The method of claim 7, comprising storing, by the host operating system, a context in a virtual volume, the context to be used for translating addresses of the virtual machine to addresses of the host.

9. The method of claim 7, wherein the message is an Input/Output (IO) request.

10. The method of claim 7, wherein processing the message comprises:
translating, by the host, a storage address contained in the IO request; and
retrieving data from a storage location identified by the storage address.

11. A tangible, non-transitory, computer-readable medium comprising code to instruct a processor to:
receive a message from a virtual machine at a frontend driver residing in the virtual machine, the message to be sent to a host of the virtual machine;
queue, by the frontend driver, messages in a shared message ring, wherein the messages comprise a callback function;
retrieve, by a backend driver residing in the host, the messages from the shared message ring; and
process the messages in the host, wherein
the message ring is shared between the frontend driver and the backend driver to provide zero-copy communication between the frontend driver and the backend driver, and
a plurality of messages are collected on the shared message ring prior to the backend driver being signaled to retrieve the messages for processing by the host.

12. The computer-readable medium of claim 11, comprising code to instruct a processor to:
store, by the host operating system, a context in a virtual volume; and
run, by the virtual machine, a volume discovery process to obtain the context, wherein the context is to be used for translating addresses of the virtual machine to addresses of the host.

13. The computer-readable medium of claim 11, wherein the processor, in response to the instruction to process the message:
translates a storage address contained in an IO request; and
retrieves data from a storage location identified by the storage address.

14. The computing device of claim 3, wherein the volume discovery process is run by the virtual machine when the virtual machine is booted.

15. The method of claim 7, wherein the message received from the virtual machine is an input/output (IO) request.

16. The method of claim 7, wherein the callback function marks the completion of the IO request.

17. The method of claim 16, wherein a plurality of completions are queued by the backend driver in the shared message ring.

* * * * *